(12) United States Patent
Mercier

(10) Patent No.: US 9,359,082 B2
(45) Date of Patent: Jun. 7, 2016

(54) AIRCRAFT AND AN AIRCRAFT POWER PLANT HAVING A CONNECTION DEVICE FOR CONNECTING TOGETHER A MAIN GEARBOX AND AN ENGINE

(71) Applicant: AIRBUS HELICOPTERS, Marignane (FR)

(72) Inventor: Christian Mercier, La Fare les Oliviers (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/623,166

(22) Filed: Feb. 16, 2015

(65) Prior Publication Data

US 2015/0232187 A1    Aug. 20, 2015

(30) Foreign Application Priority Data

Feb. 19, 2014    (FR) ...................................... 14 00444

(51) Int. Cl.
| | |
|---|---|
| *B64D 27/00* | (2006.01) |
| *B64D 27/02* | (2006.01) |
| *F16H 57/025* | (2012.01) |
| *B64C 27/00* | (2006.01) |
| *F16H 57/028* | (2012.01) |
| *B64D 27/26* | (2006.01) |
| *F16H 57/02* | (2012.01) |

(52) U.S. Cl.
CPC .............. *B64D 27/02* (2013.01); *B64C 27/001* (2013.01); *B64D 27/26* (2013.01); *F16H 57/025* (2013.01); *F16H 57/028* (2013.01); *B64C 2027/002* (2013.01); *B64D 2027/266* (2013.01); *F16H 2057/02043* (2013.01); *Y10T 74/2186* (2015.01)

(58) Field of Classification Search
CPC ........ B64D 27/02; B64D 27/26; B64D 35/00; B64D 2027/262; B64C 27/00; B64C 27/001; B64C 27/04; B64C 27/06; B64C 27/12; B64C 27/14; B64C 27/26; B64C 27/05
USPC ........................... 244/17.11, 55; 60/796, 797; 248/554–557
See application file for complete search history.

(56) References Cited

U.S. PATENT DOCUMENTS

| | | | | |
|---|---|---|---|---|
| 2,718,756 A | * | 9/1955 | McDowall | ................ F02C 7/20 248/554 |
| 3,034,583 A | | 5/1962 | Best | |

(Continued)

FOREIGN PATENT DOCUMENTS

| | | |
|---|---|---|
| FR | 1388363 | 2/1965 |
| FR | 2232481 | 1/1975 |
| JP | 2000065265 | 3/2000 |

OTHER PUBLICATIONS

French Search Report for FR 1400444, Completed by the French Patent Office on Nov. 11, 2014, 6 Pages.

*Primary Examiner* — Christopher P Ellis
*Assistant Examiner* — Richard G Davis
(74) *Attorney, Agent, or Firm* — Brooks Kushman P.C.

(57) ABSTRACT

A power plant comprising a fuel-burning engine, a main gearbox, and a drive train. The power plant includes two connection bars extending respectively along a first direction and a second direction, which directions are not parallel and intersect a common pivot axis, each connection bar being hinged by a ball joint to the main gearbox and to the engine in order to eliminate relative movements along the longitudinal direction between the main gearbox and the engine, and in order to allow limited pivoting of the main gearbox and of the engine relative to the axis.

12 Claims, 2 Drawing Sheets

(56) References Cited

U.S. PATENT DOCUMENTS

| | | |
|---|---|---|
| 3,383,933 A | 5/1968 | Shultz et al. |
| 3,921,940 A | 11/1975 | Mouille |
| 7,959,512 B2 | 6/2011 | Durand et al. |
| 2010/0038471 A1* | 2/2010 | Olsen .................... B64D 41/00 244/54 |
| 2012/0006934 A1* | 1/2012 | Prud'Homme-Lacroix ................ B64C 27/006 244/17.27 |

* cited by examiner

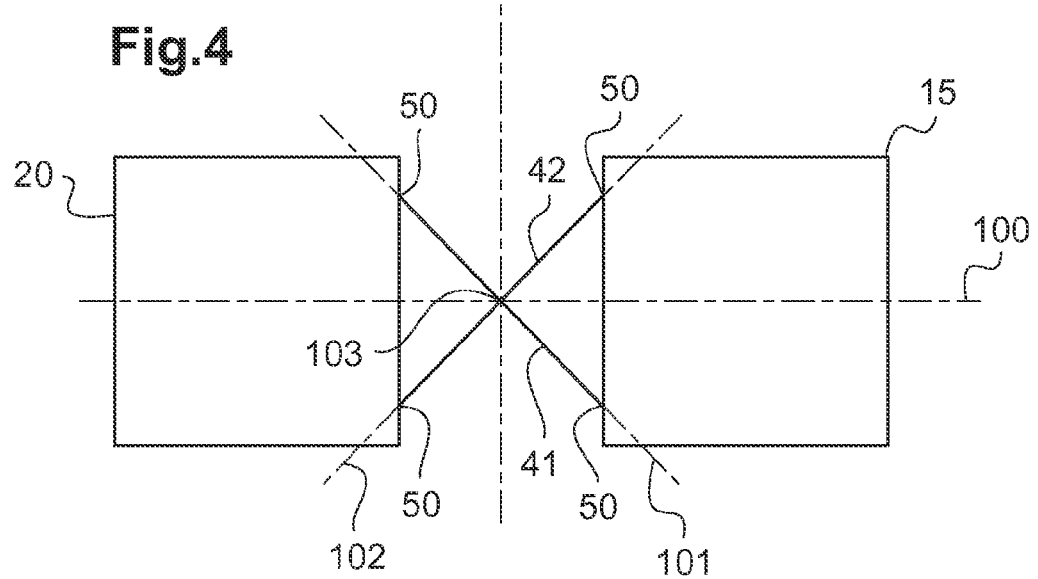
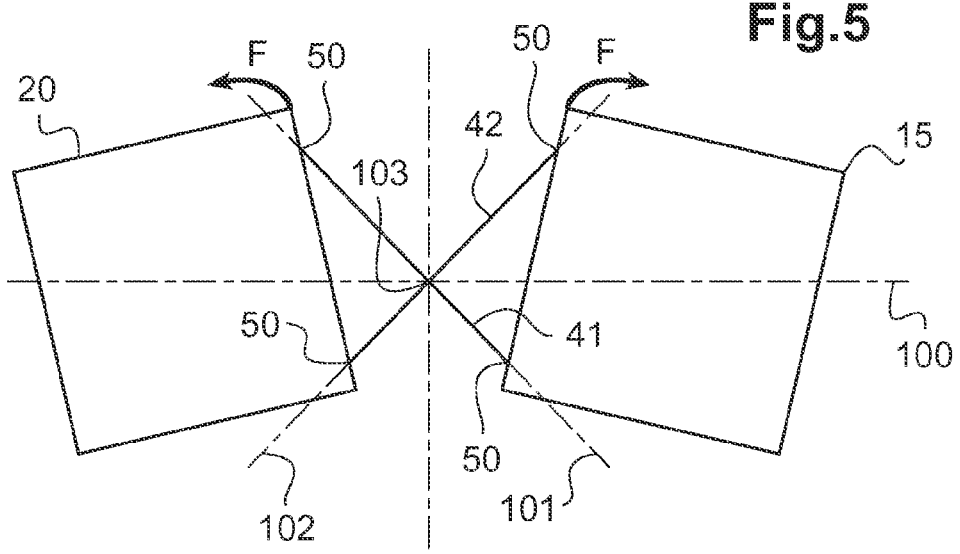

AIRCRAFT AND AN AIRCRAFT POWER PLANT HAVING A CONNECTION DEVICE FOR CONNECTING TOGETHER A MAIN GEARBOX AND AN ENGINE

CROSS REFERENCE TO RELATED APPLICATION

This application claims priority to French patent application No. FR 14 00444 filed on Feb. 19, 2014, the disclosure of which is incorporated in its entirety by reference herein.

BACKGROUND OF THE INVENTION (1) Field of the Invention

The present invention relates to an aircraft power plant and to an aircraft having the power plant. More particularly, the invention relates to a power plant having a connection device for connecting together a main gearbox (MGB) and an engine.

In particular, the invention lies in the field of rotorcraft power plants having a piston engine, and more particularly a diesel engine.

(2) Description of Related Art

Rotorcraft are generally fitted with at least one rotor that is driven in rotation by a power plant. The power plant is provided with at least one engine and with a main gearbox, said main gearbox being interposed between the engine and the rotor.

The engine may be a turbine engine connected by a drive train to the main gearbox.

Such a drive train comprises a transmission shaft extending between an outlet shaft of the engine and an inlet shaft of the main gearbox. The transmission shaft may comprise one or more segments.

While the power plant is in operation, the engine and/or the main gearbox may be subjected to small movements.

The main gearbox may be suspended to the structure of an aircraft by a conventional suspension system. The suspension system may for example comprise suspension bars and suspension means. Reference may be made to the literature in order to obtain teaching on this topic.

Likewise, an engine may be attached to the structure of the aircraft by legs, and where appropriate by energy absorber means and/or movement means such as means known as a "silent block".

Consequently, the main gearbox and/or the engine may be subjected in operation to relative movements, e.g. oscillations. The movements may be caused by the operation of the main gearbox and/or of the engine, or indeed by deformation of the structures supporting them.

As a result the members of the drive train may be moved out of alignment with one another, and that can lead to them being damaged.

In order to limit such misalignments, the power plant may include a shaft tube (named "trompette" in French language) surrounding the drive train. The tube is then rigidly fastened to the main gearbox and to the engine. The function of the tube is to tend to keep the spacing between the main gearbox and the engine constant, and to ensure sufficient alignment of the various members of the drive train. For example, a shaft tube may serve to align a transmission shaft with an inlet shaft of the main gearbox and with an outlet shaft of the engine.

Nevertheless, the risk of misalignment remains.

In order to accommodate possible misalignment between the transmission shaft, the outlet shaft of the engine, and the inlet shaft of the main gearbox, the drive train may include at least one resilient coupling means. Flexible coupling means may be of the type known as a "flector", for example. Other coupling means may be envisaged, for example means of the type described in Document U.S. Pat. No. 7,959,512.

Each flexible coupling means serves to transmit the driving torque generated by the engine to the main gearbox. Furthermore, each flexible coupling means deforms in the event of axial or angular misalignment so as to make such misalignment possible and so as to limit the impact of the misalignment on the transmission shaft. Under such circumstances, flexible coupling means may be subjected to high force levels and may deteriorate progressively. Such coupling means are therefore monitored regularly.

Furthermore, the transmission shaft may also be designed so as to present sufficient flexibility in order to accommodate a predetermined amount of misalignment.

Under such circumstances, a power plant may include a shaft tube for limiting the presence of misalignments, and may include flexible coupling means so as to ensure that any misalignment that does occur has limited consequences on the power plant.

Such a system is advantageous but difficult to design. It may require testing in order to evaluate the misalignments to which the drive train is going to be subjected. In particular, inertial movements of an engine in flight can be difficult to assess without complex testing.

For ecological and economic reasons, for example, it may also be envisaged to make use not of a turbine engine but rather of a piston engine, e.g. a diesel engine.

Nevertheless, because of the presence of reciprocating members, a piston engine is subjected to different movements while starting, while accelerating, while operating even at a stabilized speed, or while being loaded with torque. These movements are then liable to degrade the physical integrity of the transmission shaft. These movements appear to be difficult to assess in the absence of testing, in comparison with the more linear movements of a turbine engine.

Document JP 2000-065265 does not form part of the technical field of the invention since it relates to a device for limiting shear and twisting forces in a bellows.

Documents FR 2 232 481, FR 1 388 363, U.S. Pat. Nos. 3,383,933, 3,034,583, and 2,718,756 are also remote from the invention.

BRIEF SUMMARY OF THE INVENTION

An object of the present invention is thus to propose a power plant seeking to limit possible degradation of a transmission shaft, in particular in the context of using a piston engine.

The invention relates to a power plant comprising a fuel-burning engine and a main gearbox. The power plant includes a drive train extending along a longitudinal direction to connect the engine to the main gearbox, the drive train being driven in rotation by the engine and driving the main gearbox in rotation. The drive train comprises at least one transmission shaft and resilient coupling means.

This power plant then includes two connection bars extending respectively along a first direction and a second direction, which directions being not parallel and intersecting a common pivot axis. Each connection bar is hinged by a ball joint to the main gearbox and to the engine in order to eliminate relative movements along the longitudinal direction between the main gearbox and the engine, and in order to allow limited pivoting of the main gearbox and of the engine relative to the common pivot axis.

This common pivot axis may extend in a direction in elevation that is orthogonal to the longitudinal direction or to a direction parallel to said longitudinal direction.

Under such circumstances, the connection bars, by being given an appropriate configuration, naturally limit the possible movements of the engine relative to the main gearbox.

Since the connection bars are hinged via ball joints to the engine and to the main gearbox, the connection bars tend to limit relative movement of the engine and of the main gearbox to pivoting movement relative to the axis on which they converge. This relative movement then tends to be limited to pivoting about the common pivot axis intersected by both connection bars.

The two connection bars may be rigid links, each capable of transmitting compression and traction forces along their respective axes. These connection bars thus impart a dynamic constraint on the relative movements of the engine and of the main gearbox.

Consequently, the invention uses connection bars that serve to reduce the movements of the transmission shaft to movements that are predictable.

As a result, a manufacturer can evaluate the relative movements of the main gearbox and of the engine, and can thus design the drive train appropriately.

The invention is particularly worthy of interest when the engine is a piston engine and/or when the main gearbox drives a rotorcraft rotor.

Specifically, using connection bars makes the movement modes of the main gearbox and of the engine more predictable. These movements are generally difficult to predict for a piston engine since its movements and the torsor of the forces transmitted to the adjacent structures are complex and vary very considerably during a flight, unlike a turbine that operates in more constant manner. Under such circumstances, the invention provides a solution to this problem by restricting these movements to identifiable pivoting movements.

The transmission shaft may then be positioned at a location that results from the positions of the main gearbox and of the engine and also from the movements that are allowed by the connection bars. These movements are under control and can be subjected to kinematic calculation. The connection bars eliminate degrees of freedom between the engine and the main gearbox and thus enable knowledge about movement of the drive train to be improved. In particular, it is thus possible to refine the design of the transmission shaft.

Furthermore, the engine may comprise an engine block and legs. For example, the engine may be carried on four legs that support it on a structure of an aircraft and that also serve to take up the torque of the engine.

Under such circumstances, at least one connection bar may be hinged to a leg and/or at least one connection bar may be hinged to the engine block.

Furthermore, the power plant may include at least one resilient suspension system for connecting the main gearbox to a carrier structure.

Such a suspension system may be a prior art system, e.g. for the purpose of filtering the vibration that results from the rotary motion of a rotor driven by the main gearbox. Reference may be made to the literature in order to obtain the description of such a suspension.

The suspension system is thus technically advantageous but can impart a degree of freedom in movement to the main gearbox in flight. This degree of freedom in movement is nevertheless constrained by the connection bars.

Furthermore, the power plant may include at least one energy absorber means for connecting the engine to a carrier structure.

The energy absorber means may be a prior art system such as a device known as a "silent block". Reference may be made to the literature in order to obtain a description of such energy absorber means. The energy absorber means may impart a degree of freedom in movement to the engine. This degree of freedom in movement is nevertheless constrained by the connection bars.

Furthermore, the connection bars may cross one over the other between the main gearbox and the engine, and the common pivot axis is arranged between the main gearbox and the engine.

Under such circumstances, the common pivot axis may pass through the resilient coupling means.

The connection bars converge on a common pivot axis that may be located at a resilient coupling means. By way of non-exclusive example, this resilient coupling means may be a prior art, such as a device known as a "flector". Reference may be made to the literature to obtain a description of such resilient coupling means.

Thus, the resilient coupling means are stressed essentially in bending. The resilient coupling means are located at an instantaneous center of pivoting between the engine and the main gearbox. Under such circumstances, the coupling means are stressed in bending but not in shear, in traction, or in compression. The lifetime of the resilient coupling means can then be improved compared with a conventional device where the resilient coupling means are subjected to multiple forces.

Consequently, the drive train may comprise a transmission shaft connected to an outlet shaft of the engine by first resilient coupling means and to an inlet shaft of the main gearbox by second resilient coupling means. The common pivot axis then passes through the second resilient coupling means.

Optionally, a first minimum distance between the common pivot axis and the main gearbox is shorter than a second minimum distance between the common pivot axis and the engine.

This characteristic makes it possible to optimize the positioning of the transmission shaft and in particular of the second resilient coupling means in the context of the above-described embodiment, and also to optimize the sharing of the acceptable levels of deformation among the resilient coupling means by appropriately varying the location of the common pivot axis.

In addition to a power plant, the invention provides an aircraft having such a power plant. For example, the main gearbox may drive a rotor for providing the aircraft with lift and/or propulsion and/or control over yaw movement.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which:

FIGS. 4 and 5 are two diagrams showing the pivoting movement made possible by the connection bars.

Elements present in more than one of the figures are given the same references in each of them.

DETAILED DESCRIPTION OF THE INVENTION

It should be observed that three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

Figure 1:
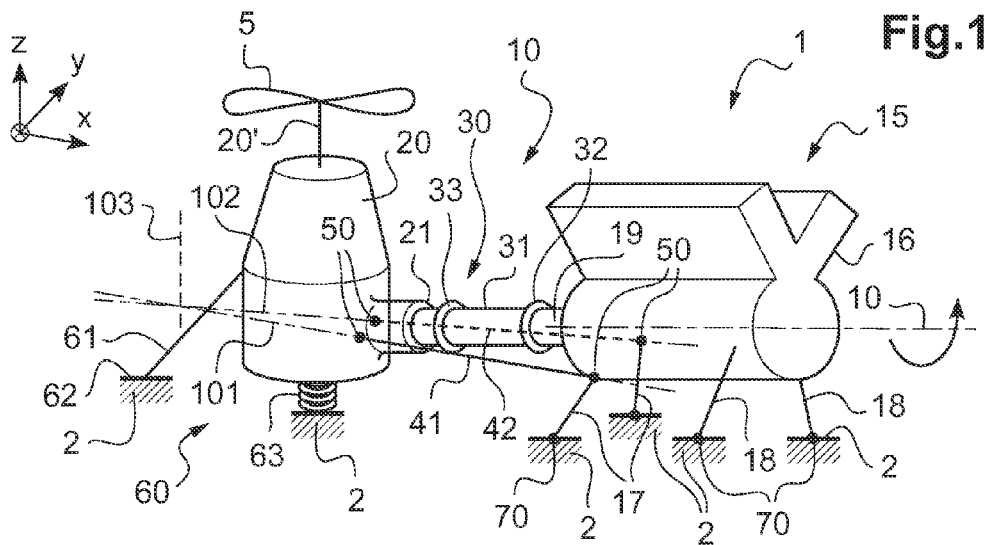
FIG. 1 is a view of an aircraft power plant of the invention.

FIG. 1 shows an aircraft 1. The aircraft 1 has a power plant 10, e.g. for setting a rotor 5 into rotation. The aircraft may be a rotorcraft, the rotor 5 then being for example a rotor that provides the rotorcraft with at least some of its lift and/or with propulsion.

The power plant 10 comprises an engine 15 supported by a structure 2 of the aircraft. The engine 15 is a fuel-burning engine, and possibly a piston engine.

Independently of the nature of the engine, the engine 15 has an engine block 16 and legs 17, 18. The term "engine block" is used to designate the driving portion as such of the engine 15, while the term "legs" designates means for fastening the engine to the structure 2.

By way of example, the engine block is supported on the structure 2 via four legs, in particular a pair of "front" legs 17 and a pair of "rear" legs 18.

Furthermore, the engine 15 may be connected to the carrier structure directly via its legs, or indirectly via at least one energy absorber means 70. For example, energy absorber means 70 may be interposed between each leg 17, 18 and the structure 2. At least one leg may also include such energy absorber means.

The engine 15 serves in particular to drive a main gearbox 20 of the power plant 10.

This main gearbox 20 may then include a mast 20' for setting the rotor 5 into rotation.

Furthermore, the main gearbox 20 is connected to the carrier structure either directly or indirectly by a resilient suspension system 60. The resilient suspension system may possibly be provided with connection bars 61, rocker devices 62, or indeed means 63 interposed between the bottom of the main gearbox 20 and the structure 2 of the aircraft.

The power plant is then provided with a drive train 30 extending along a longitudinal direction 100 from the engine 15 to the main gearbox 20. The longitudinal direction 100 may be an axis of symmetry of the transmission shaft.

The drive train may comprise a transmission shaft 31 and two resilient coupling means 32 and 33. The transmission shaft 31 may be provided with one or more segments that are connected to one another. Nevertheless, the variant of FIG. 1 shows a transmission shaft having only one segment.

Under such circumstances, the transmission shaft 31 is optionally connected by first resilient coupling means 32 to an outlet shaft 19 of the engine 15. Furthermore, the transmission shaft 31 may be connected by second resilient coupling means 33 to an inlet shaft 21 of the main gearbox 20.

In addition, the power plant has two connection bars 41 and 42 connecting the engine 15 to the main gearbox 20. This power plant need not have any shaft tubes.

Each connection bar 41, 42 is hinged both to the main gearbox 20 and to the engine 15 via respective ball joints 50.

Each connection bar 41, 42 is thus hinged by a ball joint either to the engine block 16 or to a leg 17 of the engine 15.

A first connection bar 41 extends in a first direction 101 that is not parallel to the longitudinal direction 100. Furthermore, a second connection bar 42 extends in a second connection 102 that is not parallel either to the longitudinal direction 100 or to the first direction 101.

Consequently, on going from the engine 15 the first direction 101 and the second direction 102 converge on a common pivot axis 103 extending in elevation. For example, the first direction 101 and the second direction 102 are symmetrical relative to the longitudinal direction 100.

Depending on the angles of inclination of the first direction 101 and of the second direction 102 relative to the longitudinal direction 100, one of the connection bars may possibly pass over the other connection bar. The connection bars may also be coplanar, with one of the connection bars passing through an orifice in the other connection bar.

Figure 2:
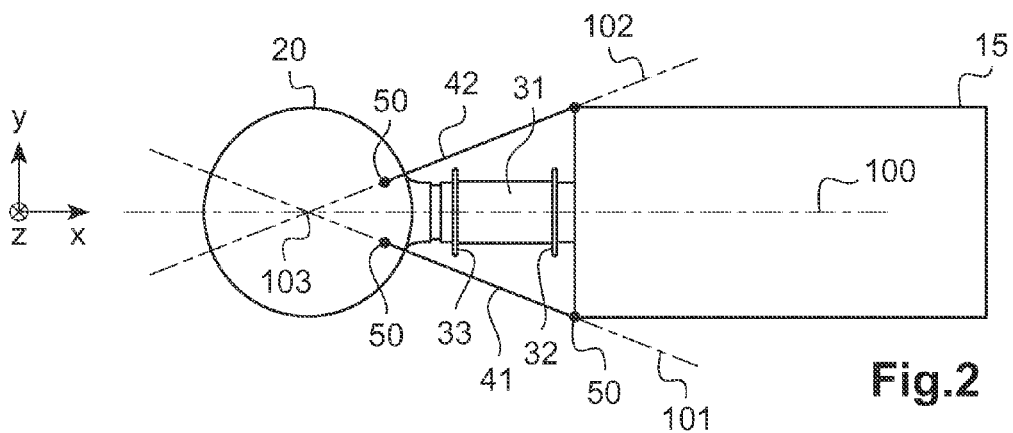
FIG. 2 is a diagram showing two connection bars converging on a common pivot axis located at a main gearbox.

In the variant of FIG. 2, this angle of inclination is small. Under such circumstances, the connection bars 41 and 42 converge on a common pivot axis 103 located at the main gearbox 20. As a result the connection bars 41 and 42 do not cross.

Figure 3:
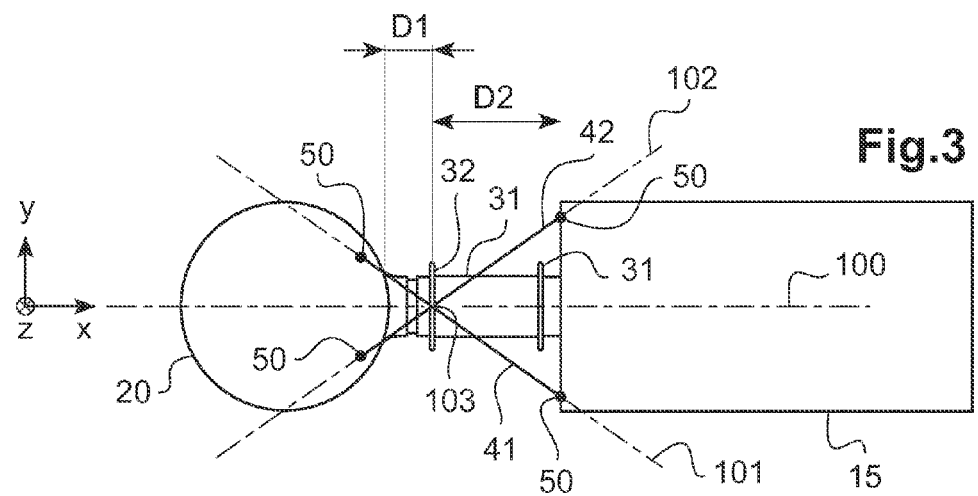
FIG. 3 is a diagram showing two connection bars converging on a common pivot axis located between a main gearbox and an engine.

In contrast, this angle of inclination is greater in the variant shown in FIG. 3. Under such circumstances, the connection bars 41 and 42 converge on a common pivot axis 103 located between the main gearbox 20 and the engine 15. As a result the connection bars 41 and 42 may cross with one passing over the other where they intersect the common pivot axis 103.

The common pivot axis 103 may then be closer to the main gearbox 20 than to the engine 15. Thus, a first minimum distance D1 between the common pivot axis 103 and the main gearbox 20 is less than a second minimum distance D2 between the common pivot axis 103 and the engine 15. The first distance is said to be "minimum" in that it represents the shortest distance between the common pivot axis 103 and the casing of the main gearbox 20. Likewise, the second distance is said to be "minimum" in that it represents the shortest distance between the common pivot axis 103 and the casing of the engine block 16.

Under such circumstances, the common pivot axis 103 may intersect one of the resilient coupling means of the drive train, and in particular the second resilient coupling means 33.

The common pivot axis may be located longitudinally between the first resilient coupling means 32 and the second resilient coupling means 33. This arrangement serves to share deformation at will between these two resilient coupling means.

Independently of the variant, the common pivot axis 103 may intersect the longitudinal direction 100.

Furthermore, the common pivot axis 103 presents an instantaneous pivot axis of the main gearbox 20 relative to the engine 15, and vice versa.

When the engine is in operation, the connection bars 41 and 42 allow the main gearbox 20 and the engine 15 to turn in opposite directions relative to the common pivot axis 103, and then tend to prevent relative movement along the longitudinal direction 100 between the main gearbox 20 and the engine 15.

FIGS. 4 and 5 explain this operation.

With reference to FIG. 4, the main gearbox 20 and the engine 15 are arranged in theoretical position corresponding to when the engine 15 is stopped.

In contrast, while the engine 15 is in operation, the main gearbox 20 and/or the engine 15 tend to move away from their theoretical positions.

With reference to FIG. 5, these movements are constrained by the connection bars 41 and 42. The connection bars tend to induce opposing turning movements on the main gearbox 20 and on the engine 15 relative to the common pivot axis 103, as represented by arrows F.

These movements are thus well identified. The manufacturer can thus take these movements that are to be expected in flight into consideration when dimensioning the drive train, in particular.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A power plant comprising a fuel-burning engine and a main gearbox, said power plant including a drive train extending along a longitudinal direction to connect the engine to the main gearbox, the drive train being driven in rotation by the engine and driving the main gearbox in rotation, the drive train comprising at least one transmission shaft and resilient coupling means, wherein the power plant includes two connection bars extending respectively along a first direction and a second direction, which directions being not parallel and intersecting a common pivot axis, each connection bar being hinged by a ball joint to the main gearbox and to the engine in order to eliminate relative movements along the longitudinal direction between the main gearbox and the engine, and in order to allow limited pivoting of the gearbox and of the engine relative to the common pivot axis.

2. A power plant according to claim 1, wherein the engine is a piston engine, the main gearbox driving a rotorcraft rotor.

3. A power plant according to claim 1, wherein the engine comprises an engine block and legs, and at least one connection bar is hinged to a leg.

4. A power plant according to claim 1, wherein the engine comprises an engine block and legs, and at least one connection bar is hinged to the engine block.

5. A power plant according to claim 1, wherein the connection bars cross one over the other between the main gearbox and the engine, and the common pivot axis is arranged between the main gearbox and the engine.

6. A power plant according to claim 5, wherein a first minimum distance between the common pivot axis and the main gearbox is shorter than a second minimum distance between the common pivot axis and the engine.

7. A power plant according to claim 1, wherein the power plant has at least one resilient suspension system for connecting the main gearbox to a carrier structure.

8. A power plant according to claim 1, wherein the power plant includes at least one energy absorber means for connecting the engine to a carrier structure.

9. A power plant according to claim 1, wherein the common pivot axis passes through the resilient coupling means.

10. A power plant according to claim 9, wherein the drive train comprises a transmission shaft connected to an outlet shaft of the engine by first resilient coupling means and to an inlet shaft of the main gearbox by second resilient coupling means, and the common pivot axis passes through the second resilient coupling means.

11. A power plant according to claim 1, wherein the common pivot axis is orthogonal to the longitudinal direction.

12. An aircraft, wherein the aircraft includes a power plant according to claim 1.

* * * * *